(12) United States Patent
Halasa et al.

(10) Patent No.: US 7,906,593 B2
(45) Date of Patent: Mar. 15, 2011

(54) RUBBER COMPOSITION CONTAINING AN ALKOXYSILANE COUPLED IN-CHAIN FUNCTIONALIZED ELASTOMER AND TIRE WITH COMPONENT THEREOF

(75) Inventors: Adel Farhan Halasa, Bath, OH (US); Wen-Liang Hsu, Cuyahoga Falls, OH (US); Kenneth Allen Bates, Brunswick, OH (US); David Andrew Benko, Munroe Falls, OH (US); Shingo Futamura, Wadsworth, OH (US); Kuo-Chih Hua, Richfield, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 958 days.

(21) Appl. No.: 11/110,025

(22) Filed: Apr. 20, 2005

(65) Prior Publication Data
US 2006/0247360 A1    Nov. 2, 2006

(51) Int. Cl.
| C08C 19/12 | (2006.01) |
| C08F 4/46 | (2006.01) |
| C08F 236/00 | (2006.01) |
| C08F 30/08 | (2006.01) |
| B60K 15/04 | (2006.01) |
| B60C 1/00 | (2006.01) |
| C08K 5/24 | (2006.01) |
| A61K 8/81 | (2006.01) |
| C08G 73/10 | (2006.01) |

(52) U.S. Cl. ........... 525/359.1; 526/173; 526/338; 526/279; 524/225; 524/262; 524/265; 524/269; 524/280; 524/282; 524/283; 524/392

(58) Field of Classification Search ........... 525/359, 525/359.1; 526/279, 173, 338; 524/225, 524/262, 265, 269, 280, 282, 283, 392
See application file for complete search history.

(56) References Cited

U.S. PATENT DOCUMENTS
| 6,127,468 | A * | 10/2000 | Cruse et al. .......... 524/225 |
| 6,825,306 | B2 * | 11/2004 | Halasa et al. ........ 526/279 |
| 2004/0044157 | A1 | 3/2004 | Halasa et al. ........ 526/173 |

FOREIGN PATENT DOCUMENTS
| EP | 796869 | 9/1997 |
| EP | 524133 | 2/1998 |
| EP | 693505 | 5/1999 |
| WO | WO 2004/111093 | 12/2004 |

OTHER PUBLICATIONS

European Search Report, completed Jul. 4, 2006.

* cited by examiner

*Primary Examiner* — William K Cheung
(74) *Attorney, Agent, or Firm* — Henry C. Young, Jr.

(57) ABSTRACT

This invention relates to a precipitated silica reinforced conjugated diene-based elastomer composition containing an alkoxysilane coupled, in-chain functionalized, conjugated diene-based elastomer and to a tire having at least one component thereof. Said in-chain functionalized conjugated diene-based elastomer is a conjugated diene-based elastomer which contains a plurality of at least one of in-chain p- and m-(2-pyrrolidinoethyl) styrene (PES) and m-(2-pyrrolidino-1-methylethyl) alpha-methylstyrene (PAMS) groups.

13 Claims, No Drawings

RUBBER COMPOSITION CONTAINING AN ALKOXYSILANE COUPLED IN-CHAIN FUNCTIONALIZED ELASTOMER AND TIRE WITH COMPONENT THEREOF

FIELD OF THE INVENTION

This invention relates to a precipitated silica reinforced conjugated diene-based elastomer composition containing an alkoxysilane coupled, in-chain functionalized, conjugated diene-based elastomer and to a tire having at least one component thereof. Said in-chain functionalized conjugated diene-based elastomer is a conjugated diene-based elastomer which contains a plurality of at least one of in-chain p- and m-(2-pyrrolidinoethyl) styrene (PES) and m-(2-pyrrolidino-1-methylethyl) alpha-methylstyrene (PAMS) groups.

BACKGROUND OF THE INVENTION

It is important for rubbery polymers (elastomers), particularly conjugated diene-based elastomers (including copolymers of conjugated diene(s) with vinylaromatic materials such as, for example, styrene), that are used in various components of tires to have good compatibility with elastomer reinforcing fillers, such as, for example precipitated silica.

For such purpose, conjugated diene-based elastomers have, for example, been functionalized with in-chain functionality (functionality of units contained within elastomer chain) to enhance their compatibility and promote improved interaction with such elastomer reinforcing fillers. Exemplary of such functionalized diene-based elastomers are, for example, styrene/butadiene copolymer elastomers which are in-chain functionalized with a functionalized styrene monomer which is functionalized with at least one of p- and m-(2-pyrrolidinoethyl) styrene (PES) and m-(2-pyrrolidino-1-methylethyl) alpha-methylstyrene (PAMS) groups. Such in-chain functionality of the elastomer is formed by copolymerization of monomers (e.g. 1,3-butadiene and non-functionalized styrene monomers) together with a small amount of pre-functionalized styrene monomer so that the functionalization of the resulting styrene/butadiene copolymer elastomer, derived from the small amount of functionalized styrene monomer, is positioned within the elastomer itself. Examples of such in-chain functionalized elastomers are, for examples, terpolymers of styrene/PES/butadiene and styrene/PAMS/butadiene. For example, see U.S. Patent Application Publication No. 20040044157

European Patent Publication No. EP 0 693 505 relates to a functionalized polymer where its functionalization is provided by a functionalized initiator instead of a functionalized monomer to therefore lead to a single end functionalized polymer rather than an in-chain functionalized polymer which contains a plurality of in-chain functionalization groups which are contained within the polymer itself.

In said U.S. patent application Ser. No. 10/389,131, it was observed that only a very small amount of the functionalized monomer (e.g. PES) could be utilized to not only provide useful plurality of in-chain functional groups for the elastomer but, also that, for a precipitated silica reinforced rubber composition, an amount of silica coupling agent (e.g. a bis(3-triethoxysilylpropyl) polysulfide) could be significantly reduced.

However, it was also observed that the resultant associated bound functionalized conjugated diene-based elastomer content to the precipitated silica reinforcement may be relatively low when using an in-chain PES functionalized conjugated diene-based elastomer (e.g. a styrene/PES/butadiene terpolymer) when used with a reduced amount of a relatively conventional bis(3-triethoxysilylpropyl) polysulfide silica coupling agent, thus tending to limit the desirability and advantage of utilization of such in-chain functionalization (e.g. with a PES or PAMS derived in-chain functionality) of a conjugated diene-based elastomer for precipitated silica reinforcement of conjugated diene-based elastomers.

Such phenomena may perhaps be due to inadequate chemical bonding between the PES or PAMS (contained in the elastomer chain) and the precipitated silica reinforcement.

In practice, it is considered herein that a relatively high bound elastomer content for the precipitated silica reinforcement in a conjugated diene-based elastomer composition is normally desirable to achieve suitable physical properties for the associated rubber composition for a tire tread such as for example better abrasion resistance.

It therefore remains desirable to increase the bound elastomer content of such in-chain functionalized conjugated diene-based elastomers (e.g. styrene/PES/butadiene terpolymer or styrene/PAMS/butadiene terpolymer elastomer).

For this invention, by slightly coupling an in-chain functionalized styrene/butadiene copolymer elastomer (e.g. styrene/PES/butadiene terpolymer or styrene/PAMS/butadiene terpolymer) at the end of the elastomer chain via an alkoxysilane, particularly an organoalkoxysilane polysulfide, the silica-bound rubber content of a precipitated silica reinforced elastomer composition can be significantly increased.

In the description of this invention, rubber compound, sulfur-cured rubber compound, rubber composition, rubber blend and compounded rubber terms may be used interchangeably to refer to rubber (e.g. elastomer) which has been mixed with rubber compounding ingredients, unless otherwise indicated. The terms "rubber", "elastomer" and "rubbery polymer" may be used interchangeably unless otherwise indicated. The term "phr" refers to parts by weight of an ingredient per 100 parts by weight of rubber in a rubber composition. Such terms are well known to those having skill in such art.

SUMMARY AND PRACTICE OF THE INVENTION

For this invention, an alkoxysilane agent end coupled, in-chain functionalized conjugated diene-based elastomer, is provided.

In accordance with this invention, an end coupled in-chain functionalized conjugated diene elastomer is provided which is comprised of a conjugated diene-based elastomer of:

(A) a polymer of at least one of isoprene or 1,3-butadiene or their mixtures, or (B) polymer of styrene or alpha methyl styrene with at least one of isoprene or 1,3-butadiene or their mixtures, wherein said conjugated diene elastomer is in-chain functionalized by containing a plurality of functionalized styrene units distributed in the elastomer chain comprised of:

(C) p- and/or m-(2-pyrrolidinoethyl) styrene or their mixture, or (D) m-(2-pyrrolidino-1-methylethyl) alpha-methylstyrene;

wherein said in-chain functionalized conjugated diene elastomer is end coupled with an alkoxysilane agent comprised of at least one of:

(E) an alkoxysilane of the general formula (I):

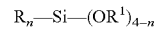

$$R_n\text{—Si—}(OR^1)_{4-n} \qquad (I)$$

wherein R is a saturated alkyl radical containing from 1 to 18 carbon atoms, $R^1$ is individually selected from alkyl radicals containing from 1 to 6 carbon atoms wherein at least one of said R¹ radicals is an ethylene radical; and wherein n is a value of from 0 to 3, preferably 1 or 2;

(F) a bis(3-trialkoxysilylalkyl) polysulfide containing an average of from 2 to 4, alternately an average of from 2 to about 2.6 or an average of from about 3.4 to about 3.8, connecting sulfur atoms in its polysulfidic bridge, (G) an organoalkoxymercaptosilane, or (H) a capped organoalkoxymercaptosilane in the sense of having its mercapto moiety capped with a moiety which uncaps the said mercapto moiety upon heating to an elevated temperature in the presence of an amine rubber sulfur cure (e.g. vulcanization) activator (for example, see U.S. Pat. No. 6,127,468).

In practice, the end coupled in-chain functionalized conjugated diene-based elastomer is considered herein as being "lightly", or partially end coupled in a sense of being, for example, from about 20 to about 60 percent end coupled, namely having from about 20 to about 60 percent of its polymer ends actually end coupled. In such manner, then, the uncoupled portion of the in-chain functionalized elastomer of one molecular weight and the end coupled portion of the in-chain functionalized elastomer is of a significantly higher molecular weight.

In such manner, the end coupled in-chain conjugated diene elastomer is viewed as being of a bimodal configuration (bimodal molecular weight configuration), wherein from about 20 to about 60 percent of said in-chain functionalized conjugated diene-based elastomer is end coupled, (and is therefor a combination of in-chain functionalized diene elastomer and substantially higher molecular weight end coupled in-chain functionalized diene-based elastomer).

Representative examples of alkoxysilanes for use in this invention as the alkoxysilane agent are, for example, tetraethoxysilane, n-octyltriethoxysilane, 3-chloropropyltriethoxysilane, 3-mercaptopropyltriethoxysilane, bis(3-triethoxysilylpropyl) disulfide, bis(3-triethoxysilylpropyl) tetrasulfide and 1-octanoylthio-1-propyltriethoxysilane.

In practice, exemplary of said organoalkoxymercaptosilane for said alkoxysilane agent is, for example, an organoalkoxymercaptosilane of the general Formula (II) represented as:

$$(X)_n(R^3O)_{3-n}\text{-Si}-R^4-SH \qquad (II)$$

wherein X is a radical selected from a halogen, preferably chlorine or bromine or alkyl radical having from one to 16, preferably from one through 4, carbon atoms; $R^3$ is an alkyl radical having from 1 through 4 carbon atoms; wherein $R^4$ is an alkylene radical having from one to 18, preferably from two through 4, carbon atoms preferably selected from methyl, ethyl, and propyl and more preferably a propyl radical: and n is an average value of from zero through 3, preferably zero; and wherein, in such cases where n is zero or 1, $R^3$ may be the same or different for each ($R^3O$) moiety in the composition, and said organalkoxyomercaptosilane of the general Formula (II) as a capped organoalkoxymercaptosilane wherein the mercapto moiety of said organoalkoxymercaptosilane is capped with a moiety which uncaps the said mercapto moiety upon heating to an elevated temperature.

Representative examples of various organoalkoxymercaptosilanes for coupling said in-chain functionalized elastomer are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

Such organoalkoxymercaptosilanes may have their mercapto moiety capped with various moieties as discussed above.

A representative example of a capped organoalkoxymercaptosilane coupling agent useful for this invention is a liquid 3-octanoylthio-1-propyltriethoxysilane as NXT™ Silane from the GE Silicones Company.

In practice, said end coupled in-chain functionalized conjugated diene-based elastomer is comprised of from about 0.05 to about 20, alternately from about 0.1 to about 5, weight percent p- and m-(pyrrolidinoethyl) styrene (PES) and/or m-(2-pyrrolidino-1-methylethyl) alpha-methylstyrene (PAMS).

In practice, the p- and m-(pyrrolidinoethyl) styrene (PES) functionalized styrene is usually in a form of a mixture of the p- and m-isometric versions thereof and may, in general, be represented by the general formula (III):

(III)

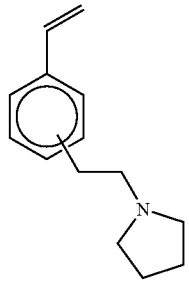

In practice, the m-(2-pyrrolidino-1-methylethyl) alpha-methylstyrene (PAMS) functionalized styrene may, in general, be represented by the general formula (IV):

(IV)

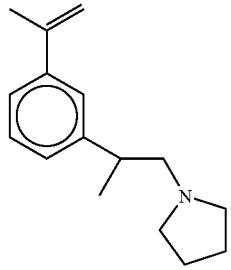

The invention further relates to a tire having at least one component of a rubber composition comprised of (containing) said end coupled functionalized terpolymer.

In further accordance with this invention, a rubber composition containing silica reinforcement is provided which is comprised of, based upon parts by weight per 100 parts by weight rubber (phr):

(A) 100 phr of at least one conjugated diene-based elastomer comprised of:
  (1) from about 10 to about 100, alternately from about 20 to about 80, phr of said alkoxysilane agent end coupled, in-chain, functionalized conjugated diene-based elastomer, and (2) from zero to about 90, alternately about 80 to about 20, phr of at least one additional synthetic conjugated diene-based elastomer, (B) from about 30 to about 120 phr of particulate reinforcing fillers comprised of:

(1) about 30 to about 120, alternately from about 30 to about 115, phr of synthetic amorphous silica (e.g. precipitated silica), and (2) from zero to about 60, alternately from about 5 to about 60 and further alternately from about 5 to about 25, phr of rubber reinforcing carbon black, and optionally (C) a coupling agent for said synthetic amorphous silica having a moiety reactive with hydroxyl groups (e.g. silanol groups) contained on said synthetic amorphous (e.g. precipitated) silica, and another different moiety interactive with at least one of said conjugated diene-based elastomers.

In practice, such coupling agent may be said alkoxysilane agent other than said alkoxysilane of the general formula (I), although said alkoxysilane may also be present.

In practice, said coupling agent may desirably be used to aid in coupling the synthetic amorphous silica (e.g. precipitated silica) to the conjugated diene-based elastomer (the end coupled, in-chain functionalized conjugated diene elastomer and said additional conjugated diene based elastomer if used) even though the end coupled, in-chain conjugated diene elastomer may already contain elements of a coupling agent in the form of the alkoxysilane end coupling agent, as herein mentioned, the said end coupling of the in-chain functionalized diene elastomer is seen herein as being "lightly" (e.g. only partially) end coupled, the additional coupling agent is seen herein as being helpful in coupling the said silica (e.g. precipitated silica) to the elastomer.

In further accordance with this invention, a tire is provided having at least one component (e.g. tire tread) comprised of said silica reinforcement-containing rubber composition (e.g. sulfur vulcanized rubber composition) which contains said alkoxysilane agent end coupled, in-chain functionalized elastomer.

As heretofore indicated, in practice, said end coupled in-chain functionalized conjugated diene-based elastomer is comprised of from about 0.05 to about 20, alternately from about 0.1 to about 5, weight percent p- and m-(pyrrolidinoethyl) styrene (PES) and/or m-(2-pyrrolidino-1-methylethyl) alpha-methylstyrene (PAMS) which are distributed within the elastomer chain.

In practice, said conjugated diene-based elastomer of said in-chain functionalized elastomer of said end coupled in-chain functionalized elastomer may be comprised of, for example, from about 5 to about 45 weight percent of styrene (in addition to the said functionalized styrene as said PES and/or PAMS), and about 10 to about 90 weight percent of said conjugated diene such as, for example, a conjugated diene selected from at least one of isoprene and 1,3-butadiene, In practice, said additional conjugated diene-based elastomer (other than the said end coupled in-chain functionalized elastomer) may be selected from, for example, at least one of polymers of at least one of isoprene and 1,3-butadiene and copolymers of styrene and at least one of isoprene and 1,3-butadiene;

In practice, said p- and m-(2-pyrrolidinoethyl) styrene (PES) and m-(2-pyrrolidino-1-methylethyl) alpha-methylstyrene (PAMS) are considered herein as functionalized styrene monomers which may be copolymerized with a conjugated diene monomer such as, for example, at least one of isoprene and 1,3-butadiene in an anionic polymerization system in a manner described in U.S. Pat. No. 6,825,306.

Said PES may be prepared, for example, by reacting p- and/or m-divinylbenzene with pyrrolidine in the presence of n-butyl lithium catalyst in a manner described in U.S. Pat. No. 6,825,306.

Similarly, said PAMS may be prepared, for example, by reacting m-diisopropenyl benzene with pyrrolidine in the presence of n-butyl lithium catalyst.

Some representative examples of elastomers (rubbery polymers) that can be provided as containing the small amounts of said in-chain functionalized styrene units as PES or PAMS (thus the end coupled in-chain include, for example, polybutadiene rubber, polyisoprene rubber, styrene-butadiene rubber (SBR), styrene-isoprene-butadiene terpolymer rubber (SIBR), styrene-isoprene rubber (SIR) and isoprene-butadiene rubber (IBR). In cases where the rubbery polymer is comprised of repeat units that are derived from two or more monomers, the repeat units which are derived from the different monomers, including the PES and PAMS functionalized monomers, will normally be distributed in an essentially random manner.

The end coupled in-chain functionalized elastomer of this invention may be prepared by a co-polymerization of styrene with a conjugated diene, such as at least one of isoprene and 1,3-butadiene, together with a small amount of said PES and/or PAMS and then end-coupling and terminating the copolymerization reaction with the alkoxysilane agent.

In practice, the alkoxysilane agent will typically be added only after a high degree of conversion of the monomers as well as the PES and/or PAMS has already been attained. For instance, the alkoxysilane agent will normally be added only after a monomer conversion of greater than about 85 percent has been realized. It will typically be preferred for the monomer conversion to reach at least about 90 percent before the alkoxysilane agent is added.

The resultant end coupled, in-chain functionalized rubbery polymer can be recovered from the organic solvent and residue by means such as chemical (alcohol) coagulation, thermal desolventization, or other suitable method. For instance, it is often desirable to precipitate the rubbery polymer from the organic solvent by the addition of lower alcohols containing from 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the rubbery polymer from the polymer cement also "terminates" any remaining living polymer by inactivating lithium end groups. After the coupled rubbery polymer is recovered from the solution, steam-stripping can be employed to reduce the level of volatile organic compounds in the coupled rubbery polymer. Additionally, the organic solvent can be removed from the rubbery polymer by drum drying, extruder drying, vacuum drying, and the like.

The various synthetic amorphous silicas (e.g. precipitated silica) useful in rubber compounding applications can be used for the synthetic amorphous silica in this invention.

Such synthetic amorphous silicas, particularly precipitated silicas, may, in general, be prepared, for example, by the acidification of a soluble silicate, e.g., sodium silicate under controlled conditions, including an inclusion of an electrolyte.

The siliceous pigment (silica) may, for example, have a BET surface area, as measured using nitrogen gas, is in a range of about 80 to about 300, although more usually in a range of about 100 to about 200, although perhaps even up to about 360, square meters per gram ($m^2/g$). The BET method of measuring surface area is described in the *Journal of the American Chemical Society*, Volume 60, Page 304 (1930).

The silica may typically have a dibutylphthalate (DBP) adsorption value in a range of about 150 to about 350, and usually about 200 to about 300 cubic centimeters per 100 grams (cc/100 g).

Various commercially available silicas may be considered for use in this invention such as, for example only and without limitation, silicas commercially available from PPG Industries under the Hi-Sil trademark with designations 210, 243, etc; silicas available from Rhodia such as, for example, Zeosil™ 1165MP and silicas available from Degussa AG with designations such as, for example, VN2, VN3, BV 3370GR and silicas from J. M Huber Company such as, for example, Hubersil 8745.

It is readily understood by those having skill in the art that the rubber composition of the tread rubber would be compounded by methods generally known in the rubber compounding art, such as mixing the various sulfur-vulcanizable constituent conjugated diene-based elastomers, including the end coupled in-chain styrene/conjugated diene-based elastomers, with various commonly used additive materials such as, for example, curing aids, such as sulfur, activators, retarders and accelerators, processing additives, such as oils, resins including tackifying resins, and plasticizers, pigments, fatty acid, zinc oxide, waxes, antioxidants and antiozonants, peptizing agents and reinforcing fillers such as, for example the indicated synthetic amorphous silica and rubber reinforcing carbon black. As known to those skilled in the art, depending on the intended use of the sulfur vulcanizable and sulfur vulcanized compounds or tread compounds, the additives mentioned above are selected and commonly used in conventional amounts.

Exemplary of rubber reinforcing carbon blacks, although such examples are not intended to be limitive, are of the ASTM designation type N-299, N-234, N-220, N-134, N-115, and N-110. The selection of the type of carbon black is well within an optimization skill by one having skill in the rubber compounding for tire treads, depending somewhat upon the intended use, purpose and properties for a tire tread. Typical amounts of tackifier resins, if used, may comprise, for example, about 0.5 to about 10 phr, usually about 1 to about 5 phr. Typical amounts of processing aids, if used, may comprise, for example, about 1 to about 80 phr. Such processing aids may include, for example, aromatic, naphthenic, and/or paraffinic processing oils or plasticizer or medium molecular weight polyesters. Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include stearic acid may comprise, for example, about 0.5 to about 4 phr. Typical amounts of zinc oxide may comprise, for example, about 2 to about 5 phr. Typical amounts of waxes, if used, may comprise, for example, about 1 to about 5 phr. Often such waxes are microcrystalline waxes. Typical amounts of peptizers, if used, may comprise, for example, about 0.1 to about 1 phr. Typical peptizers may be, for example, pentachlorothiophenol and dibenzamidodiphenyl disulfide. An antioxidant may be, for example, of the para-phenylene diamine and/or dihydrotrimethylquinoline type.

The vulcanization is conducted in the presence of a sulfur vulcanizing agent. Examples of suitable sulfur vulcanizing agents include elemental sulfur (free sulfur) or may be, for example, sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents may be used, for example, in an amount ranging from about 0.5 to about 4 phr, with a range of from about one to about 2.5 often being preferred.

Accelerators are used to control the time and/or temperature required for vulcanization and to improve the properties of the vulcanizate. Retarders may also used to control the vulcanization on-set.

In one embodiment, a single accelerator system may be used, i.e., primary accelerator. Conventionally and preferably, a primary accelerator(s) is used in total amounts ranging, for example, from about 0.5 to about 4, preferably about 0.8 to about 2.5, phr. In another embodiment, combinations of a primary and/or a secondary accelerator might be used, with the secondary accelerator being used in amounts of, for example, about 0.05 to about 3 phr, for example, in order to activate the cure and to improve the properties of the vulcanizate. Suitable types of accelerators that might be used in the present invention are, for example, amines, disulfides, guanidines, thioureas, thiazoles, thiurams, sulfenamides, dithiocarbamates and xanthates. The primary accelerator is often a sulfenamide. If a second accelerator is used, the secondary accelerator is preferably a guanidine, dithiocarbamate or thiuram compound.

The selection and amounts of most of the various compounding ingredients are not considered to be critical for the purposes of this invention, except where they may be especially emphasized elsewhere in this description, and can be adjusted or modified by the practitioner as deemed suitable for the desired tire tread properties.

The tire can be built, shaped, molded and cured by various methods which will be readily apparent to those having skill in such art.

The rubber composition may be and is preferably prepared by thermomechanically working and mixing the elastomer(s) and other rubber compounding ingredients, exclusive of the rubber curatives, in at least one sequential mixing step with at least one mechanical mixer, usually an internal rubber mixer, (usually referred to as "non-productive" mix stages), to a temperature which may be in a range of, for example, about 150° C. to about 190° for a sufficient duration of time, which may be, for example, within about 4 to about 8 minutes. In practice, although not used for the Example in this description, such mixing stage(s) may be followed by a final mix stage (usually referred to as a "productive mix stage) in which the curatives, such as sulfur and accelerators, are added and mixed therewith which may be, for example, about 1 to about 4 minutes to a temperature which may be, for example, within a range of about 90° C. to about 125° C. The terms "non-productive" and "productive" mix stages are well known to those having skill in the rubber mixing art.

It is to be appreciated that the rubber composition is conventionally cooled to a temperature below about 40° C. between the aforesaid mix stages.

It is to be further appreciated that the aforesaid duration of time for the required temperature maintenance for the mixing process(es) during the non-productive mix stages can be accomplished, for example, by (A) adjusting the motor speed of the mixer, namely reducing the motor speed after the desired temperature of the rubber composition is reached, in a variable speed mixer or by (B) utilizing two or more sequential mix stages sufficient to satisfy the duration requirement for the aforesaid maximum mixing temperature maintenance.

Vulcanization of the rubber compositions are generally carried out at conventional temperatures which may range, for example, from about 100° C. to about 200° C. Usually preferably, the vulcanization is conducted at temperatures ranging from 120° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tread for a pneumatic tire which is the subject of this invention. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE I

Samples (Comparative Sample A, Sample B and Comparative Sample C) of silica reinforcement-containing rubber compositions were prepared.

Comparative Rubber Sample A contained Elastomer A as an in-chain functionalized styrene/butadiene terpolymer comprised of styrene/butadiene copolymer elastomer containing a small amount of functionalized styrene in the elastomer chain.

Rubber Sample B contained Elastomer B as the in-chain functionalized styrene/butadiene Elastomer A terpolymer having been end coupled with an alkoxysilane agent.

Comparative Rubber Sample C contained a comparative end functionalized styrene/butadiene copolymer identified herein as a comparative Elastomer C as being comparative and differentiated from the in-chain terpolymer Elastomer A.

The individual functionalized Elastomers A, B and C were compared according to their individual Mooney (ML1+4) viscosities, Tg's, molecular weights and heterogeneity (polydispersity) indexes as reported in Table 1.

The individual rubber Samples A, B and C, which individually contained said Elastomers A, B and C, were compared according to their bound rubber contents and Payne Effect values as reported in Table 2.

Sample B rubber composition contained Elastomer B as the in-chain functionalized styrene/PES/butadiene terpolymer used in Sample A except that it had been end coupled by addition of an alkoxysilane agent as an alkoxysilane polysulfide to lightly couple the in-chain functionalized terpolymer and to terminate the copolymerization reaction.

Comparative Sample C rubber composition contained a commercially available end coupled (tin-end coupled instead of alkoxysilane end-coupled) end-functionalized (amine end-functionalized instead of in-chain functionalized) styrene/butadiene terpolymer obtained as SE SLR 4601™ from the Dow Chemical company.

The in-chain functionalized conjugated diene-based Elastomer A for Sample A rubber composition was prepared by copolymerizing PES with 1,3-butadiene and styrene in the presence of n-butyl lithium catalyst in a manner described in U.S. Pat. No. 6,825,306. The copolymerization reaction was terminated by a traditional addition of a simple alcohol (e.g. isopropanol).

The end coupled in-chain functionalized diene-based Elastomer B for Sample B rubber composition was prepared by end coupling the Elastomer A used for Sample A near the conclusion of its formative polymerization process by addition of an alkoxysilane agent as a bis(3-triethoxysilylpropyl) polysulfide having an average of from about 2 to about 2.6 connecting sulfur atoms in its polysulfidic bridge which also terminated the polymerization of the monomers.

The in-chain functionalized Elastomer A for comparative Sample A rubber composition, and therefore also Elastomer B, contained about 0.5 weight percent of in-chain p- and m-(pyrrolidinoethyl) styrene (PES) functional groups in a weight ratio of units derived from styrene to units derived from 1,3-butadiene monomers of about 25/75.

After evaporating the hexane solvent, the resulting recovered alkoxysilane agent end coupled, in-chain functionalized elastomer was dried in a vacuum oven at a temperature of about 50° C.

Various characteristics of the functionalized elastomers are reported in the following Table 1 in terms of Elastomer A (for the said in-chain functionalized elastomer used for rubber composition Sample A), Elastomer B (for the said end coupled, in-chain functionalized elastomer used for rubber composition Sample B) and Elastomer C (for the commercial tin coupled, end functionalized elastomer used for rubber composition Sample C).

TABLE 1

| Elastomer | ML1 + 4 Viscosity[1] | Tg (° C.)[2] | Mn[3] | Mw[3] | HI[4] |
|---|---|---|---|---|---|
| Elastomer A: In-chain functionalized copolymer elastomer | 33 | −53 | 130K | 139K | 1.07 |
| Elastomer B: End coupled, in-chain functionalized elastomer | 57 | −53 | 147K[5] 350K[6] | 150K[5] 378K[6] | 1.02 1.11 |
| Elastomer C—Tin end coupled, end functionalized elastomer[7] | 50 | −25 | — | — | — |

[1]Mooney viscosity (ML1 + 4) at 100° C.
[2]Mid point glass transition temperature
[3]Number average molecular weight (Mn) and weight average molecular weight (Mw) by GPC (gel permeation chromatography) analysis
[4]Heterogeniety index (HI), or polydispersity, as a ratio of Mw/Mn
[5]Molecular weight of the about 71 percent uncoupled portion of the end coupled bimodal elastomer in a sense that the in-chain functionalized elastomer was only partially coupled, namely about 29 percent coupled
[6]Molecular weight, (significantly higher molecular weight) of the about 29 percent coupled portion of the end coupled bimodal elastomer in a sense that the in-chain functionalized elastomer was only partially coupled, namely about 29 percent coupled.
[7]The Mooney viscosity and Tg were not analytically determined and are reported values for Elastomer C. The molecular weights were not determined for Elastomer C.

In particular, comparative Sample A rubber composition contained Elastomer A as an in-chain functionalized styrene/PES/butadiene terpolymer.

The in-chain functionalized styrene/PES/butadiene copolymer elastomer of Elastomer A, and therefore also of Elastomer B, had a microstructure composed of about 55 weight percent 1,2-isomeric polybutadiene units, about 25 percent isomeric 1,4-polybutadiene units, about 19.5 percent styrene units and about 0.5 weight percent random in-chain PES units according to analysis by NMR (nuclear magnetic resonance analysis).

From Table 1 it can be seen that Mooney (ML1+4) viscosity of 57 for the Elastomer B (used for the rubber composition of Sample B), namely the alkoxysilane end coupled in-chain functionalized elastomer, was significantly higher than the Mooney (ML1+4) viscosity of only 33 for the in-chain functionalized Elastomer A, and the Mooney (ML1+4) viscosity of 50 for the end functionalized Elastomer C.

The rubber composition formulations for rubber composition Samples A, B and C, which contained Elastomers A, B and C, respectively, are illustrated in the following Table 2. The parts and percentages are by weight unless otherwise indicated.

TABLE 2

| Material | Sample A | Sample B | Sample C |
|---|---|---|---|
| Non-Productive Mixing (between 120-160° C.), Internal rubber Mixer | | | |
| In-chain functionalized Elastomer[1] | 100 | 0 | 0 |
| Coupled in-chain functionalized elastomer[2] | 0 | 100 | 0 |
| Coupled end functionalized elastomer[3] | 0 | 0 | 100 |
| Silica[4] | 56 | 56 | 56 |
| Rubber processing oil[5] | 10 | 10 | 10 |
| Zinc oxide | 3.5 | 3.5 | 3.5 |
| Stearic acid[6] | 2 | 2 | 2 |
| Antioxidant[7] | 2.2 | 2.2 | 2.2 |

[1]Elastomer A as said in-chain functionalized styrene/PES/butadiene terpolymer
[2]Elastomer B as said alkoxysilane end coupled in-chain functionalized styrene/PES/butadiene terpolymer
[3]Elastomer C as said tin coupled end functionalized (amine terminal end functionalized) elastomer as SE SLR 4601 ™ from the Dow Chemical Company
[4]Precipitated synthetic silica as Zeopol ™ 8745 from the J M Huber Corporation
[5]Naphthenic rubber processing oil
[6]Primarily stearic acid also containing oleic and palmetic acids
[7]Phenylene diamine based antioxidant In the following Table 3, the percent bound rubber and Payne Effect values for the rubber composition Samples A, B and C are reported. The parts and percentages are by weight unless otherwise indicated.

TABLE 3

| Sample | Percent Bound Rubber[1] | Payne Effect G' (1% strain)/G' (50% strain) |
|---|---|---|
| Rubber Sample A | 53 | 2.8 |
| Rubber Sample B | 77 | 2.4 |
| Rubber Sample C | 32 | 7.3 |

[1]Bound rubber, namely rubber bound to the precipitated silica as determined by immersing 0.4 grams of each rubber sample in 15 cc of toluene for about 48 hours at room temperature (about 23° C.). Following the immersion period, the swollen samples were dried in a vacuum chamber overnight at 70° C. The weights of a rubber sample prior to its immersion and after vacuum drying were compared and bound rubber was calculated using conventional procedure.

From Table 3 it can be seen that the rubber composition Sample B containing the end coupled, in-chain functionalized Elastomer B of this invention, had a significantly higher bound rubber content of 77 percent than either of comparative Rubber Sample A of 53 percent or comparative Rubber Sample C of 32 percent.

This is considered herein to be significant because the bound rubber content of the rubber composition is an indication of the polymer/reinforcing filler interaction.

The significantly greater percent of bound rubber for Rubber Sample B therefore indicates a significantly greater polymer/reinforcing filler interaction when using the alkoxysilane agent end coupled in-chain functionalized Elastomer B as compared to both comparative Rubber Sample A which contained Elastomer A which was not alkoxysilane agent end coupled and comparative Rubber Sample C which contained Elastomer C which was tin end coupled instead of being alkoxysilane end coupled and which was end functionalized instead of being in-chain functionalized.

This is also considered herein to be significant because the higher bound rubber content of Rubber Sample B, containing the Elastomer B, is indicative of a strong polymer/filler interaction, is also indicative of better various physical properties for the rubber composition.

The Payne Effect value is a ratio of dynamic modulus (G') for low dynamic strain (1 percent dynamic strain) to dynamic modulus (G') for high dynamic strain (50 percent dynamic strain) determined from a dynamic strain sweep at 11 Hertz at 100° C. by an RPA analytical instrument (e.g. Rubber Process Analyzer as RPA 2000™ instrument by Alpha Technologies, formerly the Flexsys Company and formerly the Monsanto Company. References to an RPA-2000 instrument may be found in the following publications: H. A. Palowski, et al, *Rubber World*, June 1992 and January 1997, as well as *Rubber & Plastics News*, Apr. 26 and May 10, 1993.

A lower Payne Effect value is an indication of less filler-to-filler interaction (filler-to-filler reinforcement networking) within the rubber composition.

It can be seen from Table 2 that the Payne Effect value for 2.4 for Rubber Sample B, containing Elastomer B, is an indication of reduced filler-filler reinforcement interaction, namely an indication that the reinforcing filler particles are more separated from each other and therefore better dispersed within the rubber composition as compared to the higher Payne Effect value of 2.8 for the rubber composition of comparative Rubber Sample A, containing Elastomer A, and as compared to the significantly higher Payne Effect value of 7.1 for the rubber composition of comparative Rubber Sample C, containing Elastomer C.

The lower Payne Effect value for the rubber composition of Rubber Sample B, containing Elastomer B, is also considered to be significant because is indicative of better polymer-filler interaction and thus various better physical properties for the rubber composition as compared to the rubber compositions of comparative Rubber Samples A and C.

EXAMPLE II

To the rubber Sample B is blended sulfur and vulcanization accelerator and the resultant rubber composition vulcanized at an elevated temperature to form a sulfur vulcanized rubber composition. A tire is provided having a tread of said sulfur vulcanized rubber composition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An end coupled in-chain functionalized conjugated diene elastomer which is comprised of a conjugated diene-based elastomer comprised of:

(A) a polymer of at least one of isoprene or 1,3-butadiene or their mixtures, or (B) polymer of styrene or alpha methyl styrene with at least one of isoprene or 1,3-butadiene or their mixtures, wherein said conjugated diene elastomer is in-chain functionalized by containing a plurality of functionalized styrene units distributed in the elastomer chain comprised of:

(C) p- and/or m-(2-pyrrolidinoethyl) styrene or their mixture, or (D) m-(2-pyrrolidino-1-methylethyl) alpha-methylstyrene;

wherein said in-chain functionalized conjugated diene-based elastomer is end coupled with an alkoxysilane agent comprised of a capped organoalkoxymercaptosilane in the sense of having its mercapto moiety capped with a moiety which uncaps the said mercapto moiety upon heating to an elevated temperature in the presence of an amine rubber sulfur cure activator;

wherein said end coupled in-chain functionalized conjugated diene-based elastomer is of a bimodal molecular weight configuration with from 20 to 60 percent of said in-chain functionalized conjugated diene-based elastomer being end coupled.

2. The end coupled in-chain functionalized elastomer of claim 1 containing from about 0.05 to about 20 weight percent of said p- and/or m-(pyrrolidinoethyl) styrene and/or m-(2-pyrrolidino alpha-methylethyl) alpha methylstyrene functionalized styrene units.

3. The end coupled in-chain functionalized elastomer of claim 1 wherein said plurality of said functionalized styrene units are distributed substantially randomly in the elastomer.

4. The end coupled in-chain functionalized elastomer of claim 1 wherein said functionalized styrene units are units of said p- and/or m-(pyrrolidinoethyl) styrene.

5. The end coupled in-chain functionalized elastomer of claim 1 wherein said functionalized styrene units are units of said m-(2-pyrrolidino alpha-methylethyl) alpha methylstyrene.

6. The end coupled in-chain functionalized elastomer of claim 1 comprised of said in-chain functionalized elastomer end coupled with an alkoxysilane agent comprised of an organoalkoxymercaptosilane composition comprised of at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane, wherein the mercapto moiety of said organoalkoxymercaptosilane composition is capped with a moiety which uncaps the said mercapto moiety upon heating to an elevated temperature in the presence of an amine based elastomer sulfur cure activator.

7. The end coupled in-chain functionalized elastomer of claim 1 comprised of said in-chain functionalized elastomer end coupled with an alkoxysilane agent comprised of a capped organoalkoxymercaptosilane composition comprised of a 3-octanoylthio-1-propyltriethoxysilane.

8. A tire having at least one component of a rubber composition containing said end coupled in-chain functionalized elastomer of claim 1.

9. A rubber composition containing silica reinforcement is provided which is comprised of, based upon parts by weight per 100 parts by weight rubber (phr):

(A) 100 phr of at least one conjugated diene-based elastomer comprised of:

(1) from about 10 to about 100 phr of said end coupled, in-chain, functionalized diene-based elastomer of claim 1, and (2) from zero to about 90 phr of at least one additional synthetic diene-based elastomer, (B) from about 30 to about 120 phr of particulate reinforcing fillers comprised of:

(1) about 30 to about 120 phr of synthetic amorphous silica, and (2) from zero to about 60 phr of rubber reinforcing carbon black, and optionally, (C) a coupling agent for said synthetic amorphous silica having a moiety reactive with hydroxyl groups contained on said synthetic amorphous silica, and another different moiety interactive with at least one of said diene-based elastomers.

10. The rubber composition of claim 9 which contains said coupling agent.

11. A tire having at least one component comprised of the rubber composition of claim 9 as a sulfur vulcanized rubber composition.

12. The tire of claim 11 wherein said component is a tread, wherein the conjugated diene-based elastomer of said end coupled in-chain functionalized elastomer is comprised of about 5 to about 45 weight percent of styrene and about 10 to about 90 weight percent of said conjugated diene selected from at least one of isoprene or 1,3-butadiene or their mixture, wherein said additional synthetic diene-based elastomer is selected from polymers of at least one of isoprene and 1,3-butadiene and copolymers of styrene and at least one of isoprene and 1,3-butadiene and wherein said synthetic amorphous silica is a precipitated silica.

13. A tire having at least one component of a rubber composition containing said end coupled in-chain functionalized elastomer of claim 6.

* * * * *